US 3,846,155
Patented Nov. 5, 1974

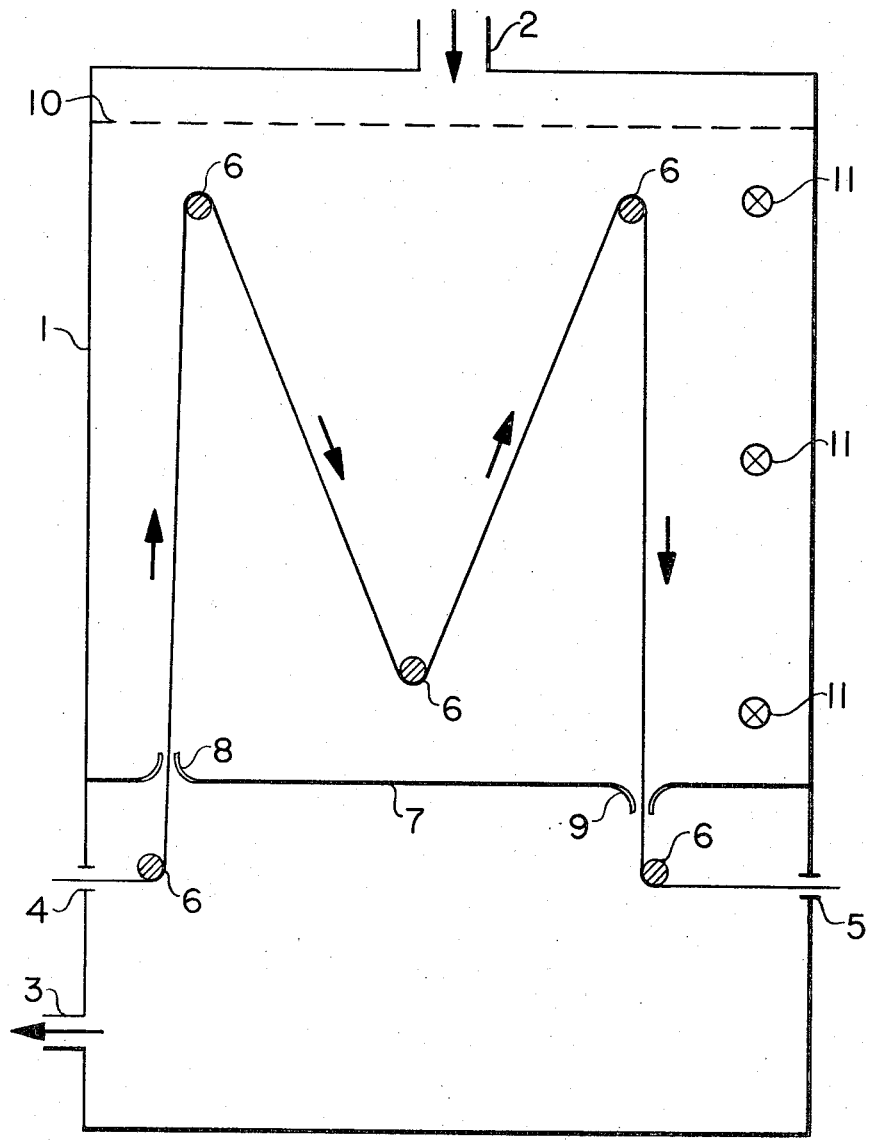

3,846,155
FLAME RETARDANT PROCESS FOR CELLULOSICS
George M. Wagner, Lewiston, N.Y., assignor to Hooker Chemical Corporation, Niagara Falls, N.Y.
Filed Apr. 17, 1972 Ser. No. 244,574
Int. Cl. B44d 1/44
U.S. Cl. 117—62.2                                     6 Claims

ABSTRACT OF THE DISCLOSURE

An apparatus and process for imparting flame retardance to cellulose containing materials have been devised whereby materials which have been impregnated with a solution having a pH of from about 7 to about 9 and a tetrakis(hydroxymethyl) phosphonium hydroxide content of from about 10 to about 40 percent by weight are dried to a moisture content of from about 0 to about 8 percent and the monomer is polymerized on and in the cellulose materials by exposure in an enclosed chamber to a atmosphere containing from about 50 to about 90 percent by volume of gaseous ammonia for about 5 to about 30 seconds. The monomer is rapidly and effectively polymerized on and in the cellulose containing materials thereby imparting durable flame retardance to the materials in a rapid and efficient manner which is readily adaptable to high speed commercial textile processing machinery.

FIELD OF INVENTION

This invention relates to an improved process for rendering cellulose-containing materials flame retardant. More particularly, it relates to a more rapid and hence more practical process for polymerizing tetrakis tris(hydroxymethyl) phosphonium on and in cellulose-containing materials with ammonia to render them durably flame retardant. It related also to an apparatus for rapidly and efficiently polymerizing the monomer on and in the cellulose containing materials.

BACKGROUND OF THE INVENTION

In U.S. Pat. 3,607,356, it has been proposed to impregnate cellulose-containing materials with an aqueous solution containing an equilibrium mixture of tris(hydroxymethyl) phosphine ("THP") and tetrakis(hydroxymethyl) phosphonium hydroxide ("THPOH"), said solution having a pH of about 7 to about 8. In this process, the impregnated material containing from 10 to about 40 percent by weight of the monomer is dried to about 10 to about 20 percent moisture and then treated with gaseous ammonia in an enclosed cabinet to polymerize the resin monomers. The gaseous ammonia treatment step requires from one or two to six minutes exposure time depending upon the character, i.e., the weight, fibrous nature, etc., of the treated material. In many textile processes, the materials are processed in equipment operating at high speed in a continuous manner. Accordingly, operations involving processing times of several minutes duration require either static operation or units of such size wherein such relatively long residence times can be obtained. It is, therefore, desired to process such materials in equipment wherein shorter residence times consistent with high speed continuous operations can be obtained in a practical manner. Moreover, the treatment according to the process of U.S. Pat. 3,607,356, when used with available ammonia treatment cabinets, has been found to produce finishes on cellulosic materials which often tended to dust and the durability of the finished materials often failed to meet the stringent government standards (Department of Commerce Standard FF–3–71) which require that the treated materials withstand at least fifty home washing and drying cycles. The enclosed chamber for carrying out the ammonia treatment commonly used in this field comprises a series of perforated pipes housed in a box like enclosure having a large opening in the top. The partially dried impregnated material is passed over the perforated pipes through which ammonia gas is forced. The excess ammonia gas is vented through the opening in the top of the enclosure, and discharged into the atmosphere. This venting of considerable quantities of ammonia gives rise to a severe pollution problem. It can thus be seen that the process disclosed in U.S. Pat. 3,607,356 not only results in a highly inefficient utilization of ammonia but also is hardly practical for the lighter, open weave, materials and leaves much to be desired when processing heavier and/or close knit materials.

It is known, also, as disclosed in U.S. Pat. 2,983,623, to cure a further polymerizable methylol-phosphorus polymeric material containing at least one free methylol group attached to a phosphorus atom incorporated in a cellulosic material, by exposing said material in the dry state to the action of gaseous ammonia followed by subjecting it to an aqueous ammonia treatment. In this process, the further polymerizable resins disclosed are solutions of reaction products of tetrakis(hydroxymethyl) phosphonium chlorides and urea which solutions are relatively strongly acid and are applied in the presence of buffers which adjust the pH of the solutions to a pH within the range of about 3.5 to 4. The impregnated materials are thoroughly dried and then exposed to ammonia gas for about 5 to 10 or more minutes and then immersed in aqueous ammonia for about 10 or more minutes to complete the cure of the resin on and in the material. Such a process also requires relatively long time cycles of treatment especially in the aqueous ammonia bath and hence is hardly applicable with modern high speed processing techniques.

The apparatus and process of the present invention differs from these and other less pertinent prior art procedures in providing a more rapid, effective, and practical ammonia curing step and is applicable with currently used high speed textile processing equipment.

OBJECTS OF THE INVENTION

It is, therefore, a principal object of the present invention to provide an improved process for treating cellulose-containing materials to render them durably flame retardant.

Another object is to provide a more rapid process for imparting flame retardant characteristics to cellulose-containing materials whereby said materials are impregnated with a solution of tetrakis(hydroxymethyl) phosphonium hydroxide, dried to remove substantially all of the retained moisture and rapidly and efficiently cured by gaseous ammonia.

A particular object is to provide a process which does not require in the curing step, prolonged exposure of the impregnated material to either large excesses of gaseous ammonia or aqueous ammonia or both.

Another object is to provide a suitable apparatus for the rapid and efficient polymerization of the resin on the cellulosic material with gaseous ammonia.

These and other objects will be apparent to those skilled in the art by the following description of the present invention.

SUMMARY OF THE INVENTION

It has now been found that cellulose-containing materials can be rapidly and economically rendered durably flame retardant by a process which comprises:

(a) impregnating a cellulose-containing material with a solution of tetrakis(hydroxymethyl) phosphonium hydroxide having a pH of from about 7 to about 9, and containing from about 10 to about 40 percent by weight of tetrakis(hydroxymethyl) phosphonium hydroxide, (b) drying the impregnated material, preferably under relatively mild conditions, to a moisture content of from about 0 to about 8 percent by weight, and (c) exposing the dried material for a period of at least about 5 seconds but less than about 45 seconds to atmosphere containing at least about 50% by volume of ammonia to cure the phosphorus containing resin in and on the material and render it durable flame retardant.

The curing step of the new process may be carried out in an enclosed cabinet which comprises a housing;

gas inlet means disposed in the upper portion of said housing;

gas outlet means disposed in the lower portion of said housing;

material inlet means and material outlet means disposed in the lower portion of said housing above said gas outlet means;

partition means disposed in said housing between said gas inlet means and said gas outlet means so as to form a gas treatment chamber in the upper portion of said housing, said partition means including means for permitting the introduction into and removal from said gas treatment chamber of textile material to be treated in said chamber while minimizing the passage of gas into and from said gas treatment chamber; and means disposed in said gas treatment chamber for supporting textile material to be treated.

The ammonia treated material may be washed and dried numerous times without substantial loss of fire retardancy.

DETAILED DESCRIPTION OF THE INVENTION

In accordance with a preferred mode of carrying out the improved process of this invention, an aqueous solution of tetrakis (hydroxymethyl) phosphonium hydroxide containing from about 10 to about 40 percent by weight of tetrakis (hydroxymethyl) phosphonium hydroxide and having a pH of from about 7 to about 9 is prepared and used to impregnate a cellulose-containing material, and, after drying the impregnated material to about 0 to about 8 percent moisture, exposing said material for at least about 5 to less than about forty-five seconds and preferably for about 15 to about 30 seconds to an atmosphere containing at least about 50 percent by volume of ammonia, and preferably from about 70 to about 90 percent of gaseous ammonia. The thus treated material containing an insoluble polymer of the phosphonium compound in and on the material is washed and dried.

The treatment of the dried impregnated material with ammonia, i.e., the curing step, is carried out in an enclosed chamber wherein the impregnated material is exposed to a gaseous atmosphere containing a high, concentration, i.e., above about 50 percent by volume, of ammonia. The material is preferably passed into and out of the chamber, in a continuous manner and at a relatively high speed, so that the material is exposed to the ammonia atmosphere for at least 5 seconds and preferably from about 15 to about 30 seconds.

A particularly effective, and hence preferred, apparatus for carrying out the curing step of this process is illustrated by the attached drawing which shows a schematic view of the enclosed cabinet apparatus of this invention. In this drawing the housing, 1, contains a gas inlet, 2, and a gas outlet, 3, which is conveniently connected to a suction means, not shown. The housing is provided also with a material inlet, 4, and material outlet, 5, for admitting the dried impregnated material and exiting the cured material. Material guides, 6, are provided for conveying the impregnated material through the cabinet. Partitioning means, 7, extending across the interior of the housing serves to form a chamber in which the material is contacted with the gas. The partitioning means includes flaps, 8 and 9, which permits the material to be treated to enter the gas treatment chamber and the treated material to exit from said chamber, while minimizing the passage of gas into and from the said chamber. A gas distribution device, shown here as a perforated plate, 10, is provided to assist in the distribution of the entering gas stream evenly throughout the gas treatment chamber. Sensing ports, 11, are provided in the gas treatment chamber for removal of samples of the gaseous atmosphere for analysis to monitor the concentration of the treatment gas.

The housing may be provided with cooling means, not shown, to cool the treatment chamber and to regulate the temperature of the gaseous atmosphere within the treatment chamber. A liquid condensate discharge port, not shown, may be positioned at a convenient place in the housing for removal of condensate from the chamber.

The housing can be fabricated from conventional materials of construction such as wood, metal, glass, plastic and the like or any combination thereof.

The partition means, 7, may be constructed from like materials or from rubber. The flaps, 8, and 9, are fabricated from flexible materials such as rubber, leather, plastic film and are attached to the partition means in any convenient manner. It is important that the flaps do not impede the passage of the material therethrough but do substantially prevent the free flow of gas into and out of the treatment chamber.

In operating this apparatus, ammonia gas is fed into the unit through gas inlet, 1, at a rate sufficient to provide an ammonia atmosphere within gas treatment chamber having at least about 50 percent by volume of ammonia, and preferably from about 70 percent to about 90 percent ammonia by volume. Cellulosic material which has been impregnated with tetrakis (hydroxymethyl) phosphonium hydroxide and dried to contain from about 0 to about 8 percent moisture is admitted to the apparatus, preferably in a continuous manner, at inlet 4, and is passed over material guides, 6, through partitioning means, 7, through flap, 8, into the gas treatment chamber wherein the impregnated material is exposed to the ammonia atmosphere. The material leaves the gas treatment chamber passing through flap, 9, of partitioning means, 7, and exits from the housing, 1, at material outlet, 5. The passage of air into the gas treatment chamber is minimized in part by the partitioning means and in part by the withdrawal of gas from the housing through gas outlet, 3, which is connected to a mild suction means e.g., a vacuum pump.

The rate of flow of ammonia gas into the apparatus is adjusted to provide at least one mol of ammonia per mole of tetrakis (hydroxymethyl) phosphonium hydroxide available for reaction, i.e., curing, on the impregnated material. Preferably about a 20 percent molar excess of ammonia is supplied. This amount of ammonia can be approximated by the following calculation:

$$\frac{\text{lbs. of impregnated material}}{\text{yard of material}} \times \frac{\text{Yds.}}{\text{min.}} \times \frac{\text{Percent THPOH}}{100}$$

$$\times \frac{\text{Percent wet pick up}}{100} \times \frac{1}{172} = \text{mols of THPOH/min.}$$

$$\frac{\text{mols THPOH}}{\text{min.}} \times \frac{359 \text{ ft.}^3}{\text{mol.}} \times 1.2 = \text{cu. ft. NH}_3 \text{ gas/min.}$$

The treated material having the insoluble polymer deposited therein is then oxidized, washed and dried.

The cellulose materials which can be treated to impart flame retardant properties thereto in accordance with this invention include cotton, rayon, paper, jute, ramie, wood and mixtures thereof, as well as blends of cellulosics, such as cotton or rayon with synthetic materials, such as nylon, polyesters, acrylics, and with proteinaceous fibers, such as wool and the like. The process of this invention is particularly effective when applied to the treatment of cellulosic-containing materials such as cotton and rayon.

The solution used to impregnate the cellulose-containing material comprises tris(hydroxymethyl) phosphine and tetrakis(hydroxymethyl) phosphonium hydroxide as an equilibrium mixture. Such a solution is well known in this art and can be prepared by several known methods. Preferably these solutions are prepared by reacting an aqueous solution of tetrakis(hydroxymethyl) phosphonium chloride with an approximately equimolar quantity of an organic or inorganic base, preferably sodium hydroxide. The pH of the final solution is adjusted to from 7 to 9 and preferably to from 7.5 to 8.1. For the purpose of this invention, the active component of the aqueous solution is considered to be tetrakis(hydroxymethyl) phosphonium hydroxide. Hereinafter, the active component will be expressed in terms of this component, although it is probable that there is present a mixture of tris(hydroxymethyl) phosphine and tetrakis(hydroxymethyl) phosphonium hydroxide.

The aqueous treating solution may be applied to the cellulosic material in any convenient manner. For example, the solution may be applied by padding, dipping, spraying, and the like. After impregnation, the excess solution is preferably removed from the material by passing the material through squeeze rolls, centrifuging, wringing, or other methods. Although a wet-pick up of from about 50 to about 200 percent may suitably be used, preferably the material contains about an equal weight, i.e., about 100 percent pick-up, of the treating solution.

The impregnated material is then dried to a residual moisture content of about 0 to about 8 percent and preferably from about 0 to about 3 percent. The drying is carried out in air or in drying oven at temperatures which may vary from ambient to about 100 degrees centigrade. Excessive drying temperatures and times are to be avoided. The drying time may vary according to the drying temperature and also the weight and fibrous nature of the material, as will be obvious to those skilled in this art. The moisture content of the material may be measured by a conventional moisture meter.

The dried impregnated material is exposed to gaseous ammonia in an enclosed chamer wherein the resin monomer reacts rapidly and completely to form an insoluble polymer within the material. The gaseous atmosphere which comprises at least about 50 percent of gaseous ammonia, and preferably from about 70 to about 90 percent or more of gaseous ammonia provides an effective, efficient and surprisingly rapid reactant for the resin curing step. It has been found that the curing step is completed, under these conditions, in less than about 45 seconds and generally less than about 30 seconds, and as low as 5 seconds, whereas in prior art procedures from about one to about six minutes were required from substantially complete polymerization and curing of the impregnated composition. Under optimum conditions, the procedure and apparatus of this invention proceeds with the efficient utilization of the gaseous ammonia charged to the process whereas prior art processes often referred up to a 15 fold excess of the ammonia reactant. This huge excess of ammonia presented a serious air pollution problem, which in the present process and apparatus has been eliminated by the highly efficient utilization of the ammonia.

Following the polymerization and/or curing operation, the treated material is preferably oxidized, scoured or washed to remove unpolymerized materials and the like. Where the present invention is carried out on yard goods using mill apparatus, this scouring operation may be effected using any of the conventional scouring processes such as rope scouring, open width scouring, jig scouring and the like. The scouring may be conveniently carried out using, e.g., an aqueous soap solution containing small amounts of sodium carbonate, perborate or peroxide, and synthetic detergents. Preferably this scouring is carried out immediately after the curing step. The scouring step may be followed by a conventional drying operation and thereafter the dried treated material may be subjected to any normal finishing operation such as sanforizing, calendering, and the like.

The flame retardant cellulose-containing materials treated in accordance with the procedures set forth above have been found to be durably flame retardant, even after fifty or more home laundering and drying cycles. Additionally, such materials are substantially free from dust and have a tear resistance, tensile strength, and hand which are substantially unchanged from those of untreated materials.

The process of this invention is readily adaptable to modern high speed commercial textile processing equipment. Substantial savings of time and of consumption of ammonia gas, in the range of about 100 to 200 percent, are effected by this improved process.

The following examples will illustrate the process of the present invention. In these examples, as well as in the above specification and the claims hereinafter set out, parts and percentages are by weight and temperatures are given in degrees Fahrenheit, unless otherwise specified. Flame retardancies reported were determined in accordance with the procedure of the American Association of Textile Chemists and Colorists, Test AATCC Base 34-1952.

Example I

An aqueous solution containing about 40 percent tetrakis (hydroxymethyl) phosphonium hydroxide and having a pH of 7.4 was used to impregnate strips of 4 oz. per sq. yd. cotton sheeting material. The impregnated material was passed through squeeze rolls to give a wet pick up of about 100 percent. The strips of the impregnated material were dried from various times in a 200 degree oven and the dried strips were then exposed in an enclosed cabinet for 15 seconds to an atmosphere consisting of 80 percent by volume of ammonia and 20 percent by volume of air. The treated strips were oxidized with aqueous hydrogen peroxide, scoured, rinsed with cold water and dried. The resin add-on of the dried scoured material was determined and the flame retardant character of the treated material was evaluated after the dried material was heated for 45 minutes in a solution containing 90 parts of soap, 90 parts soda ash, and 10 parts of a synthetic anionic detergent in about 50,000 parts of water and rinsed in hot (145°) water for 15 minutes, repeating the heating and rinsing nine times ("9 boil cycles"). This accelerated laundering test is roughly equivalent to at least fifty home washing and drying cycles. Each strip was weighed before impregnation and after drying. The ratio of the weight of the dried impregnated strip and the untreated strip, as well as the moisture content of the dried strip is set out in the following table.

TABLE I

| Ratio, Wt. dried cloth strip/Wt. initial cloth strip | Moisture retained, percent | Minutes dried at 200° | Resin add-on, percent | Char length after 9 boil cycles |
|---|---|---|---|---|
| 1.84 | 41 | 0.0 | 10.5 | Burns |
| 1.77 | 34 | 0.3 | 15.5 | Burns |
| 1.73 | 30 | 0.5 | 16.6 | Burns |
| 1.59 | 16 | 0.8 | 19.1 | Burns |
| 1.58 | 15 | 1.0 | 18.8 | Burns |
| 1.50 | 7 | 1.3 | 20.6 | 4.0 |
| 1.39 | 4 | 1.7 | 22.3 | 4.0 |
| 1.35 | 0 | 2.0 | 20.7 | 3.0 |
| 1.33 | 0 | 2.0 | 21.5 | 4.5 |
| 1.29 | 0 | 4.0 | 22.7 | 4.0 |
| 1.28 | 0 | 4.0 | 20.5 | 3.5 |
| 1.27 | 0 | 6.0 | 20.1 | 4.0 |
| 1.25 | 0 | 8.0 | 18.8 | Burns |

These data indicate the efficient and rapid polymerization of dried impregnated materials in highly concentrated gaseous ammonia atmosphere. They show that incomplete drying, that is about 15 percent moisture retention and above results in only transient fire retardancy or nondurable fire retardancy, whereas when the drying is carried out to remove all but about seven percent or less of the moisture the fire retardancy of the treated material is durable. However, overdrying e.g. for about 8 minutes or more at 200 degrees, results in a loss of resin add-on and fire retardant character.

Example II

The procedure of Example I was repeated using 5.5 oz. per sq. yd. cotton tubular knitted material as the material treated. This knitted material is a heavier material than the cotton sheeting used in the preceding example and accordingly the tests carried in this Example are more severe tests of the efficiency of the present procedure. The test results are set out in the following table.

TABLE II

| Ratio, Wt. of dried impregnated material/Wt. of original material | Moisture content of dried material, percent | Minutes dried at 200° | Resin add-on percent | Char length after 9 boil cycles |
| --- | --- | --- | --- | --- |
| 1.83 | 40 | 1 | 12.6 | Burns |
| 1.73 | 30 | 2 | 13.9 | Burns |
| 1.60 | 15 | 3 | 15.4 | Burns |
| 1.48 | 5 | 4 | 17.9 | 5.3 |
| 1.40 | 0 | 6 | 18.8 | 4.3 |
| 1.29 | 0 | 8 | 19.8 | 4.0 |
| 1.27 | 0 | 10 | 19.5 | 4.) |
| 1.27 | 0 | 12 | 19.6 | 4.3 |
| 1.25 | 0 | 20 | 16.7 | 3.5 |

These results confirm the observations made from the results of Example I, viz., that at moisture contents of about 15 percent or more, durability of the flame retardant character of the treated material is lacking whereas when the moisture is reduced to about 5 percent or less, the material is rendered durably flame retardant. These tests also indicate that overdrying the material results in a reduction of the resin add-on which ultimately affects durability of the flame retardant character.

Example III

This example illustrates the use of an enclosed chamber substantialy as described above and shown on the drawing attached hereto, for the curing of the monomeric resin containing material with gaseous ammonia.

Cotton tubular knitted material, 100 yards, was impregnated with a 30 percent aqueous tetrakis(hydroxymethyl) phosphonium hydroxide solution having a pH of 7.3. The impregnated material was passed through squeeze rolls to adjust the wet pick-up to 95 percent and the material was dried to about 0 percent moisture retention (ratio of the dried material to original weight of the material=1.42) in an infrared drier at 300 degrees. The dried material was continually exposed to an 80 percent gaseous ammonia-air atmosphere in the apparatus described herein above, running the material at the rate of 4 yards/minute. The residence time of the material in the chamber was 30 seconds (a safety factor of about 6). Ammonia gas was fed to the chamber at the rate of about 1.25 mols/ mol of resin (an excess of about 25 percent). The ammonia concentration stabilized at about 70 to 80 percent in the treatment chamber. The treated material was run into an aqueous scouring bath containing about 8 percent hydrogen peroxide and thereafter passed through squeeze rolls to a 70 percent pick-up. This scour oxidizes the phosphine groups to phosphine oxide groups which are odorless and colorless and serves to stabilize the cured resin in the fiber. The scoured fabric was rinsed in cold water and dried. After being exposed to 9 boil cycles using the standard aqueous soap solution, the material was still flame retardant in character.

Example IV

This example illustrates the effect of various concentrations of gaseous ammonia in the polymerization step of the present process.

In a manner described in Example II above, equal sized samples of cotton tubular knitted goods were impregnated with a 40 percent aqueous solution of tetrakis(hydroxymethyl) phosphonium hydroxide, the impregnated samples, having a 100% wet pick-up, were dried to 0 percent moisture retention and then exposed for 5 seconds in an enclosed cabinet to atmospheres of various concentrations of gaseous ammonia. The exposed samples were scoured, rinsed and dried.

The results of these tests are set out in the following table.

TABLE III

| Ratio, Wt. of dried sample/ Ratio, Wt. of initial sample | Vol. percent $NH_3$ gas | Resin add-on, percent |
| --- | --- | --- |
| 1.33 | 20 | 11.3 |
| 1.32 | 26 | 11.4 |
| 1.33 | 39 | 13.2 |
| 1.36 | 51 | 19.6 |
| 1.29 | 80 | 19.8 |

As indicated by these results, the resin add-on in the samples treated in atmospheres having less than 50 percent $NH_3$ is quite low indicating that the polymerization was incomplete whereas these last two samples, treated in atmospheres having more than 50 percent by volume of ammonia, had a high resin add-on indicating efficient and effective polymerization.

The present invention has been described and illustrated in the above specification and examples with reference to several specific embodiments. Such reference has been made for purely illustrative purposes and various modifications in the details therein included can be made without departing from the scope and spirit of the invention, as will be obvious to those skilled in this art.

What is claimed is:

1. A process for imparting flame retardant character to cellulose containing material which comprises
   (1) impregnating a cellulose-containing material with an aqueous solution having a pH of from about 7 to about 9 and containing from about 10 to about 40 percent by weight of tetrakis(hydroxymethyl) phosphonium hydroxide compound;
   (2) drying the thus impregnated material to about 0 to about 8 percent moisture retention, and
   (3) exposing said dried material to an atmosphere containing at least about 50 percent by volume of gaseous ammonia in an enclosed chamber for a period of from about 5 to less than about 45 seconds to polymerize the phosphonium hydroxide compound in and on the cellulose containing material.

2. The process of Claim 1 wherein the impregnated material is dried to from about 0 percent to about 3 perrent moisture retention.

3. The process of Claim 2 wherein the dried material is exposed to an atmosphere containing from about 70 to about 80 percent ammonia by volume in an enclosed chamber for about 15 to about 30 seconds.

4. The process of Claim 1 wherein the cellulose containing material is a cotton textile material.

5. The process of Claim 4 wherein the cotton textile material is a tubular knitted material.

6. In a process for imparting flame retardance to a cellulose containing material which comprises impregnating the material with an aqueous solution having a pH of about 7 to about 9 and containing from about 10 to about 40 percent by weight of tetrakis(hydroxymethyl) phosphonium hydroxide, drying the thus impregnated material and polymerizing the tetrakis(hydroxymethyl) phosphonium hydroxide on and in the material by exposure to gaseous ammonia the improvements which comprise drying the impregnated material to about zero to about eight percent moisture retention and exposing the dried impregnated material to an atmosphere containing from about 50 to about 90 percent by volume of gaseous ammonia for a period of from about 5 to less than about 45 seconds.

References Cited

UNITED STATES PATENTS

| | | | |
|---|---|---|---|
| 2,772,188 | 11/1956 | Reeves et al. | 117—137 X |
| 3,096,201 | 7/1963 | Coates et al. | 117—62.2 |
| 3,310,419 | 3/1967 | Wagner | 117—62.2 |
| 3,607,356 | 9/1971 | Beninate et al. | 117—137 |

WILLIAM D. MARTIN, Primary Examiner

THEODORE G. DAVIS, Assistant Examiner

U.S. Cl. X.R.

117—136, 137, 143R